United States Patent

[11] 3,572,856

| [72] | Inventor | James D. McHugh |
| | | San Jose, Calif. |
| [21] | Appl. No. | 763,210 |
| [22] | Filed | Sept. 27, 1968 |
| [45] | Patented | Mar. 30, 1971 |
| [73] | Assignee | General Electric Company |

[54] APPARATUS FOR PRODUCING SMALL DISPLACEMENTS
8 Claims, 4 Drawing Figs.

[52] U.S. Cl. .................................................. 308/73
[51] Int. Cl. .................................................. F16c 17/06
[50] Field of Search .......................................... 308/73;
74/592; 267/(Inquired)

[56] References Cited
UNITED STATES PATENTS

| 569,012 | 10/1896 | Zink ............................ | 74/592 |
| 1,822,499 | 9/1931 | McClay ......................... | 74/592 |
| 2,758,892 | 8/1956 | Wallcren ....................... | 308/73 |
| 3,190,224 | 6/1965 | Billington ..................... | 92/107X |
| 3,202,464 | 8/1965 | Chaboseau ..................... | 308/73 |

Primary Examiner—Fred C. Mattern, Jr.
Assistant Examiner—Wesley S. Ratliff, Jr.
Attorneys—Paul A. Frank, John F. Ahern, Julius J. Zaskalicky, Melvin M. Goldenberg, Frank L. Neuhauser and Oscar B. Waddell ABSTRACT: A pair of coaxially aligned resilient members or spring members of large and small spring gradients are secured in opposed relationship with respect to a point of reference. A centrally disposed rod is fixedly secured to the remote end of the spring member of higher spring gradient and is adjustably connected to the remote end of the spring member of smaller spring gradient. A relatively large displacement of the remote end of the spring member of small spring gradient in relation to the fixed reference point causes a relatively small displacement in the spring member of larger spring gradient.

PATENTED MAR 30 1971  3,572,856

Inventor:
James D. McHugh,
by Julius J. Zaskalicky
His Attorney.

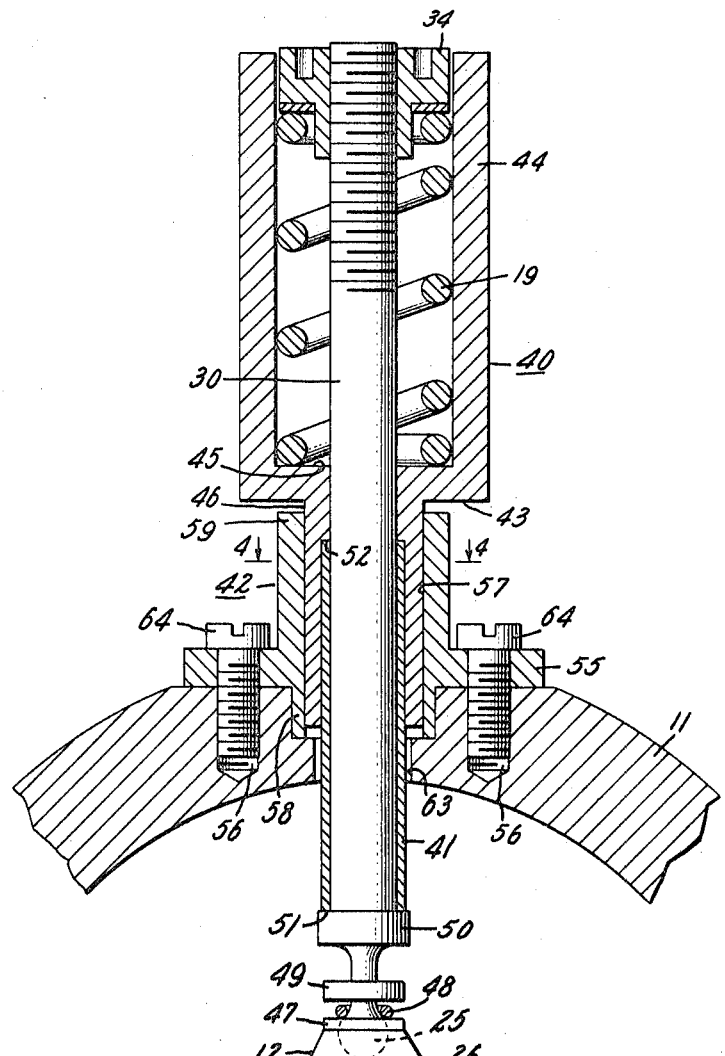
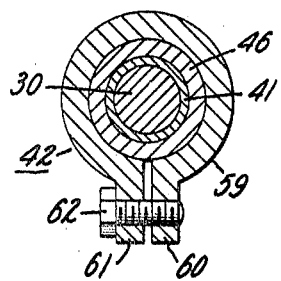

APPARATUS FOR PRODUCING SMALL DISPLACEMENTS

APPARATUS FOR PRODUCING SMALL DISPLACEMENTS

This invention relates to apparatus for producing small displacements and in particular relates to apparatus for setting the pivot circle clearance in pivoted pad journal bearings to very small tolerances.

Pivoted pad journal bearings are widely used in rotating machinery applications owing to their superior stability when compared with plain cylindrical bearings. To achieve this stability it is essential to set properly the pivot circle clearance. In certain rotating machinery, for example rotating machinery of small dimensions, each pad of the bearing must be displaced radially outward with respect to an unloaded or centered shaft a very small amount. Typically, in some machines such displacement is of the order of a few hundred microinches from the condition in which the pad just touches the journal. An accurate setting of such gap is essential to produce the correct preload for a multipad bearing to avoid destructive pad flutter.

Dial gauges, micrometer heads and shims are currently employed to adjust the pivot circle clearance of such bearings. Each of the methods employing such measuring aids as enumerated above, has disadvantages such as need for large space, difficulties in adjustment and measurement of small displacements and are time consuming. Differential screws have been proposed. However, the required adjustments are often too fine to achieve readily with finely divided threads even when disposed in differential array. In addition, threads have a certain degree of backlash which may make a precise adjustment difficult.

The present invention is directed to overcoming the disadvantages of prior art techniques for providing precise adjustment of the displacement of a pair of members such as the bearing pad and a journal supported thereby.

Accordingly, an important object of the present invention is to provide a simple and compact apparatus for setting a pair of members to within a small displacement from one another.

Another object of comprising: present invention is to provide a means of high sensitivity for producing very small displacements in one member in relation to a fixed point in response to relatively large movements in another member.

A further object of the present invention is to provide apparatus which is easily and readily set to a wide range of mechanical sensitivities for producing a small displacement in one member in response to a large displacement in another member of the apparatus.

A still further object of the present invention is to provide an apparatus for producing small displacements in response to relatively large displacements in another member of the apparatus without any backlash.

In accordance with an illustrative embodiment of the present invention, there is provided a pair of spring members one of very large spring gradient and the other of small spring gradient. The spring members are secured in coaxial and opposed relationship with respect to a point of reference. A rod is provided along the axis of the springs and is fixed to the remote end of the spring of high spring gradient and adjustably connected to the remote end of the spring of small gradient. For a relatively large displacement of the remote end of the spring member of small gradient in relation to the fixed reference point, a relatively small displacement is produced in the remote end of the spring of large gradient.

The features of my invention which I desire to protect are pointed out with particularity in the appended claims. The invention itself, however, both as to its organization and method of operation together with further objects and advantages thereof may best be understood by reference to the following description taken in connection with the accompanying drawings wherein:

FIG. 3 shows an end view in section of another embodiment of my invention as applied to a pivoted pad journal bearing.

FIG. 4 is a top sectional view of a portion of the apparatus of FIG. 3 taken along section 4-4.

Figure 1:
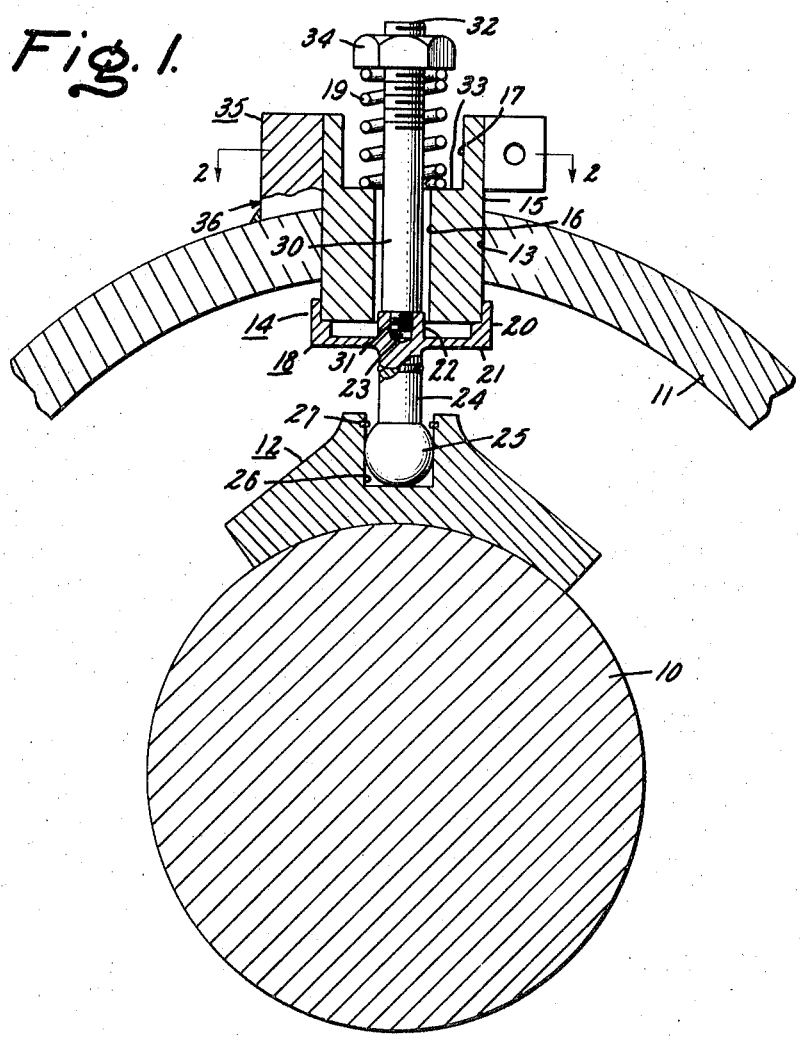
FIG. 1 is an end view of one pad of a pivoted pad journal bearing secured to the bearing housing by apparatus in accordance with the present invention.

Referring now to FIG. 1, a rotating shaft 10 is supported in a bearing housing 11 by a number of spaced pivoted bearing pads only one of which is shown at 12. The other pads may be identical to the one shown or may be conventionally supported in the housing. The bearing housing 11 is generally cylindrical in form and has a radially extending opening 13 therein for receiving the apparatus or subassembly 14 for support and adjustment of the pad 12.

The apparatus 14 includes a main cylindrical body portion 15 having a central cylindrical opening 16 of small diameter over the lower portion thereof and having another cylindrical opening 17 of large diameter over the upper portion thereof. A pair of resilient or spring members 18 and 19 are provided. One spring member 18, in the form of a cup shaped member, has a large spring gradient or spring constant and the other spring member 19, in the form of a coil spring, has a small spring gradient. The cup shaped member 18 has a cylindrical side portion 20 of considerable strength and a bottom or disc portion 21, deflectable as hereinafter described, secured to the lower end of the cylindrical portion 20. The upper end of the cylindrical portion 20 is firmly secured by welding or other suitable means to the lower end of the main support cylinder 15. The upper side of the disc member 21 has centrally located thereon a stud 22 or extension with a threaded opening 23 therein. Coaxial with the threaded stud 22 and located on the bottom side of the disc 21 is another stud 24 or stem member, the outward extending end of which terminates in a ball 25. The pad 12 has an opening 26 therein for receiving the ball 25 to form a ball joint therewith. A sealing ring 27 is provided in a recess in the sidewalls of opening 26 of the pad 12 for retaining the ball end in the pad opening thereby permitting the pad to change its attitude in response to the conditions of operation of the pad.

A rod or bolt 30 is provided in the central opening of the main cylinder 15 having a bottom threaded end 31 and a top threaded end 32. The bottom threaded end 31 is arranged to be secured in the threaded hole 23 in the cup shaped member 18. The coil spring 19 is coaxially disposed with the rod in the opening 17 having one end bearing on the shoulder 33 provided by the upper cylindrical opening 17 and the other end thereof bearing against the under surface of a nut 34 threadably engaging threads of the upper portion of the rod 30.

Figure 2:
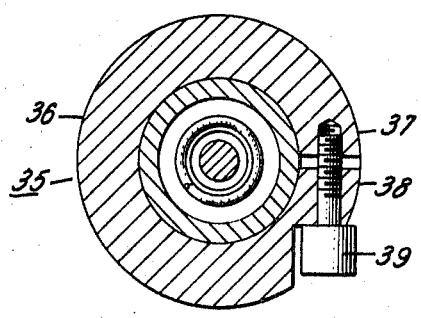
FIG. 2 is a top sectional view of a portion of the apparatus of FIG. 1 taken along section 2-2.

The main body portion 15 of the apparatus for support and adjustment of the pad is secured to the cylindrical housing 11 by means of split cylinder clamp 35 having one portion 36 thereof secured to the cylindrical housing 11 and an oppositely disposed portion having two spaced sides 37 and 38, as shown in FIG. 2. The sides 37 and 38 are drawn together to provide clamping of the main cylinder 15 in the cylindrical housing 11 by means of threaded bolt 39 extending through an opening in side 38 into a threaded hole in side 37.

In the arrangement shown, the resilient or spring member 18 is a member of high resilient or spring gradient and the spring member 19 is a spring member of small spring gradient. Spring gradient or spring coefficient designated by the letter K, is the ratio of the force on the spring to the deflection produced in the spring by such force. In the case of the spring member of high spring gradient or the disc 21, the deflection is measured from the center of the disc with respect to the peripheral support portions thereof. In the case of the spring member of small spring gradient or the coil spring 19, the deflection of the spring along the axis is the displacement thereof. In the assembly of FIG. 1, as the force on the rod 30 is equal to the forces producing deflection in both of the spring members, 18 and 19, the following equation can be written:

$$N_r \cdot k \cdot p = K \cdot \delta$$

or $$N_t = \frac{K\delta}{kp} \quad (1)$$

where
- $N_t$ represents the number of turns of the adjusting nut 34,
- p represents the pitch of the threads of the adjusting nut 34,
- k represents the spring constant of the coil spring member 19,
- K represents the spring constant of the disc spring member, and
- δ represents the deflection of the spring member 18.

The operation of the of the present invention will be appreciated by considering a specific example. Assume that a pivot pad motion of displacement δ in a radial direction of 500 microinches is required and it is desired to determine the number of turns of the adjusting nut which will produce the required displacement δ.

Let K=100,000 lbs./inch
k=100 lbs./inch
p=1/28 inch pitch of the adjusting nut threads.

By substituting in equation (1) the number of turns $N_t$ is given by $$N_t = \frac{100,000}{100} \frac{5 \times 10^{-4}}{\frac{1}{28}} = 14 \text{ turns}$$

The sensitivity, defined as the number of turns of the nut per microinch displacement of the pivot pad, is therefore, $$S = \frac{14 \text{ turns}}{500 \times 10^{-6} \text{ inches}} = 2.80 \times 10^4 \text{ turns per inch}$$

In comparison, assume a differential screw is used to adjust the pivot circle clearance of the pad. One thread of the screw will be assumed to have 28 threads per inch and the opposed thread of the screw will be assumed to have 28.5 threads per inch.

The pivot pad advance per turn for such a fine differential thread arrangement is given by:

$$\frac{\delta}{\text{turn}} = \frac{1}{28} - \frac{1}{28.5}$$

and the sensitivity S' of the differential screw is given by:

$$S' = \frac{(28.5)(28)}{(28.5-28.0)} = 0.1600 \times 10^4 \text{ turns per inch}$$

The ratio of the two sensitivities, for the opposed spring and the differential screw arrangement, therefore is:

$$\frac{S}{S'} = \frac{2.80 \times 10^4}{0.16 \times 10^4} = 17.5$$

That is, to move the pivot pad 500 microinches with the opposed spring arrangement takes 14 turns of the nut; for the differential screw only 0.8 of a turn will cause the same pivot motion. The opposed spring arrangement therefore provides a much finer adjustment than the differential screw. Moreover, it can easily be increased even further by increasing the spring rate ratio K/k.

While the sensitivity of the differential screw arrangement increases as the square of the number of threads/inch, practical limits on the number of threads per inch will restrict the fineness to less than 100 threads/inch and therefore limit the sensitivity of the differential screw arrangement.

For a particular adjustment of the two springs the two springs act in parallel so far as the external load on the pivot is concerned. Accordingly, the support stiffness will be the sum of the two spring stiffness values. This can be made greater than the lubrication fluid film stiffness so as to minimize any adverse dynamic effects of the spring support structure, such as vibration.

Referring now to FIG. 3, there is shown another embodiment of the subassembly apparatus in accordance with the present invention. The elements of this apparatus which are the same as the elements of the apparatus of FIG. 1 are denoted by the same reference numeral. The subassembly includes a main cylindrical body portion 40, a resilient or spring member 41 of large spring gradient, a coil spring member 19 of small spring gradient, a rod 30 having one end threaded and the other end terminated in a ball, a pivot pad 12 having a socket 26 therein, and a clamp assembly 42 for clamping the main cylindrical body portion 40 into the bearing support housing 11.

The main cylindrical body portion 40 includes an annular plate member 43, to the upper side of which is secured upper cylinder 44 of large inside diameter to provide a shoulder 45 on the upper surface of the plate 43, and to the bottom side of which is secured a lower cylinder 46 of smaller internal diameter aligned with a circular hole in the plate 43. The rod 30 extends coaxially through the two parts of the main cylindrical body portion with the ball end 25 fitted into the socket 26 located in the pad 12. A retaining plate 47 and retaining ring 48 is provided to secure the ball in the socket. The retaining ring may be additionally secured by the annular clamp member 49. Adjacent the ball joint end of the rod 30 is provided a collar 50 which forms a shoulder 51 on the upper face thereof with respect to the main body of the rod. The spring member 41 in the form of a cylindrical column has one end bearing on the shoulder 51 and the other end thereof is fitted into or bears against a downward extending shoulder 52 in cylinder 46. The coil spring member 19 is located inside the upper cylinder 44 having the lower end thereof abutting the upper surface 45 of the plate 43 and having the upper end thereof abutting the lower surface of a nut 34 threadably engaging the upper portion of the rod 30. Holes are provided in the nut 34 for turning thereof.

The clamp member 42 includes a central plate portion 55 with holes 56 in the periphery thereof and a central opening 57. A lower cylinder member 58 is secured to the under surface of the plate 55 having an inner diameter equal to the inner diameter of the plate. Another cylinder 59 is secured to the upper surface of the plate 55. The cylinder 59 is split along a portion of the length thereof and partially about the periphery thereof in the vicinity of the plate 55 to separate the cylinder into two opposing and movable sides 60 and 61 as seen in FIG. 4. The sides 60 and 61 are drawn together to provide clamping of the main cylinder 40 by means of a threaded bolt 62 extending through an opening in side 61 and a threaded hole in side 60. In the housing member 11 is located a stepped cylindrical opening 63, the lower portion being of small diameter than the upper portion. The diameter of upper portion of opening 63, is designed to receive the lower cylinder portion 58 of the clamp 42 and the diameter of the lower portion of opening 63 is set to permit the lower end of the bolt 30 and the column member 41 to be passed therethrough. The clamp member 42 is secured to the housing by means of screw 64.

While I have shown particular embodiments of my invention, it will, of course, be understood that I do not wish to be limited thereto since many modifications and variations may be made in the structural arrangements shown and in the instrumentalities employed. I contemplate by the appended claims to cover any such modification as fall within the true spirit and scope of my invention.

I claim:
1. In combination:
a pair of resilient members, each having a pair of ends, one of said members having a large spring gradient and the other of said members having a small spring gradient;
a reference point;
means for fixedly connecting one end of each of said resilient members to said reference point;
a rod member having a pair of end portions, one end portion of said rod member integrally connected to the other end of said resilient member of large gradient; and
means adjustably connected to the other end portion of said rod member and to the other end of said resilient member of small gradient for displacing the other end of said resilient member of small gradient along the length of said other end portion of said rod member.

2. The combination of claim 1 in which the axes of said resilient members are parallel.

3. The combination of claim 1 in which said resilient members have a common axis.

4. The combination of claim 3 in which said one resilient member is a cylinder of elastic material in which stress is applied along the axis thereof and said other resilient member is a coil spring.

5. The combination of claim 1 in which the resilient member of large spring gradient is a disc and in which the resilient member of small spring gradient is a coil spring, and in which said rod member is a rod integrally connected to the center of said disc and the periphery of said disc is integrally connected to said reference point.

6. The combination of claim 1 in which said other end portion of said rod is threaded and in which said means adjustably connected to said other end portion of said rod is an element threaded thereon and having a surface engaging said other end of said resilient member of small spring gradient.

7. The combination of claim 1 in which said means adjustably connected to said other end portion of said rod provides means for displacing in compression said resilient member of small gradient.

8. A pivoted pad journal bearing comprising:

a housing;

a plurality of pivoted pads supported in said housing to receive the journal of a shaft to be supported by said bearing, one of said pads including means for adjusting the radial clearance thereof in relation to said journal;

said adjusting means comprising:

a pair of resilient members each having a pair of ends, one of said members having a large spring gradient and the other of said members having a small spring gradient;

said one pad pivotally mounted on a stud, the ends of said resilient member of large gradient fixedly supported between said housing and said stud;

one end of said resilient member of small gradient connected to a fixed point on said housing;

a rod member having a pair of end portions, one of which is integrally connected to said stem; and means adjustably connected to the other end portion of said rod member and to the other end of said resilient member of small gradient for displacing the other end of said resilient member of small gradient along the length of said other end portion of said rod member.